United States Patent
Lange

(10) Patent No.: US 7,090,299 B2
(45) Date of Patent: Aug. 15, 2006

(54) DEVICE FOR ADJUSTMENT OF LEVEL OF INCLINATION OF BACK PART OF MOTOR VEHICLE SEAT

(75) Inventor: Dieter Lange, Petershagen (DE)

(73) Assignee: Faurecia Autositze GmbH & Co. KG, (DE)

( * ) Notice: Subject to any disclaimer, the term of this patent is extended or adjusted under 35 U.S.C. 154(b) by 0 days.

(21) Appl. No.: 11/083,143

(22) Filed: Mar. 17, 2005

(65) Prior Publication Data

US 2005/0231017 A1   Oct. 20, 2005

(30) Foreign Application Priority Data

Mar. 18, 2004  (DE) .................. 10 2004 013 272

(51) Int. Cl.
*B60N 2/02* (2006.01)
(52) U.S. Cl. ...................................... 297/362; 297/374
(58) Field of Classification Search ................ 297/362, 297/367, 374, 376
See application file for complete search history.

(56) References Cited

U.S. PATENT DOCUMENTS

| 4,371,207 | A |  | 2/1983 | Wilking et al. | |
| 6,619,743 | B1 |  | 9/2003 | Scholz et al. | |
| 6,637,821 | B1 | * | 10/2003 | Lee et al. | 297/362 |
| 6,755,470 | B1 | * | 6/2004 | Iwata et al. | 297/374 |
| 6,918,635 | B1 | * | 7/2005 | Finner et al. | 297/362 |

FOREIGN PATENT DOCUMENTS

| DE | 30 13 304 A1 | 10/1981 |
| DE | 199 38 666 A1 | 2/2001 |
| DE | 101 44 840 A1 | 3/2003 |
| DE | 101 57 273 A1 | 6/2003 |

* cited by examiner

*Primary Examiner*—Anthony D. Barfield
(74) *Attorney, Agent, or Firm*—Synnestvedt Lechner & Woodbridge LLP

(57) ABSTRACT

The present invention relates to a device for adjustment of level of inclination of back part of a motor vehicle seat having a device part (2) affixed to the seat part and a device part (3) affixed to the back part, which can be pivoted counter to each other about a pivot axis (14), wherein both device parts (2, 3) have parts of gearings (4, 5) forming a swash mechanism, which roll on each other under the action of eccentric elements (11) that can be rotated about a pivot axis (14). The eccentric elements (11) are comprised of an eccentric ring (12), on which two regionally covering mirroring wedge segments (13) lie These are urged away from each other in the sense of an increase in eccentricity (e) by spring elements (15) arranged one of their front surfaces (13.3). The object of the invention is to provide a device for adjustment of the level of inclination, wherein the space between the fronts of the wedge segments loaded by the spring elements is free of support elements in order to facilitate the incorporation of the spring elements. This object is achieved in that the support of the wedge segment (13) is on its other surface (13.4), in that there radial stop surfaces (31.1) are provided on the wedge segments (13) and radial stop surfaces (30.1) are provided on the eccentric ring (12), whereby the stop surfaces (31.1, 30.1) each are formed on projections (31. 30) of the wedge segment (13) or of the eccentric ring (12).

5 Claims, 8 Drawing Sheets though that the embodiments described here illustrate the invention and do not limit the invention and that those skilled in the art, upon reading this specification, will be able to

DEVICE FOR ADJUSTMENT OF LEVEL OF INCLINATION OF BACK PART OF MOTOR VEHICLE SEAT

CROSS REFERENCE TO RELATED APPLICATIONS

This application claims the priority of German Patent Application 10 2004 013 272.0 filed on Mar. 18, 2004, the entire contents of which is hereby incorporated in total by reference.

BACKGROUND OF THE INVENTION

1. Field of the Invention.

The present invention relates to a device for adjustment of the level of inclination of the back of a motor vehicle seat.

2. Description of Related Art.

This type of device for adjustment of the level of inclination has an inside and an outside gearing, which are manufactured by forming using cutouts of the metal plate of the device parts. Here the outer gearing has one less tooth than the number of teeth on the inside gearing and one of the devices is mounted on a cam means that can be rotated about the pivot axis, said eccentric means in turn is mounted on the other device. In the device concerned here for adjustment of the level of inclination the cam means are comprised of two wedge segments, which are mounted directly or indirectly on the one device part and are urged apart from each other by means of an energy storage device, most generally a spring, in terms of an increase of the eccentricity in the peripheral direction. By doing so, any play in the gearing and in the mounting is avoided. In a drive of the eccentric means about the pivot axis of the device for adjusting inclination the inside gearing or the one device part rolls on the outside gearing of the other device part, whereby a pivoting is obtained corresponding to the difference in toothing of the device part affixed to the back part vis-a-vis the device part affixed to the seat. Devices of this type for adjusting the level of inclination are, for example, known form DE 30 13 304 A1, DE 199 38 666 A1 and DE 101 44 840 1. In these devices the eccentric rings are joined so as not to rotate with a rotary adjusting member that introduces torque. The carrier means for loading the wedge segments are configured on the eccentric ring. For release of the wedge segments, the eccentric ring must initially be rotated against the frictional force and the forces acting from the backrest on the wedge segments, whereby at the start of the adjustment there is a substantial mechanical friction (tightness).

In these prior art devices for adjusting inclination, stops are provided for the purpose of limiting the load on the spring elements arranged between the wide front surfaces of the wedge segments beyond the spring elements' limit of elasticity. These consist of either projection oriented to each other and formed on the wide front surfaces of the wedge segments or, however, of spacers disposed in the space between said front surfaces. These support elements have the drawback that they make assembly of the spring element more difficult by constricting the installation space between the front surfaces of the wedge segments.

DE 101 57 273 A1 discloses a device for adjusting inclination, wherein the carrier means, in this case a pair of carrier fingers, are arranged separated from the eccentric ring force free in the device for adjusting inclination. The eccentric elements in this device for adjusting inclination are also comprised of an eccentric ring and two wedge segments mounted thereupon. The eccentric ring is assembled from two mirrored disks arranged behind one another and which have mounting holes, into which one of each of the ends of a omega spring engage, so that the two disks of the eccentric ring are biased relative to each other in the peripheral direction. In order to release the wedge segments the rotary adjusting element is turned, so that one of the carrier fingers carries one of the disks of the eccentric ring.

SUMMARY OF THE INVENTION

The object of the present invention is to provide a device for adjusting inclination, wherein the space between the faces of the wedge segments loaded by the spring element for facilitation of installation of the spring means is free of support elements.

This object is achieved according to the invention using a device for adjusting inclination described in this disclosure.

Thus, according to the invention, the support elements are moved, for preventing overloading the spring element, from the constricted space between the front surfaces of the wedge segments loaded by the spring elements at the other front surfaces of the wedge segments. The space between the front surfaces of the wedge segments loaded by the spring element is now free from "internals", which facilitates the assembly of the spring elements.

By providing a gap between the alternating stop surfaces of the wedge segments and the eccentric ring, it is possible to shift the wedge segment loaded by the carrier element on the eccentric ring so that the wedge segment is released. If the stop surfaces of the wedge segment and the eccentric ring come in contact, then the driven wedge segment carries the eccentric ring; that is, it rotates it about the pivot axis of the device for adjusting inclination. In virtue of the rotation of the eccentric ring the wedge segment not loaded by the carrier means is released and he stop surface of the wedge segment comes into contact at the associated stop surface of the eccentric ring. By doing this, overloading the spring element is avoided.

These and other features of the invention will be more fully understood by reference to the following drawings.

DETAILED DESCRIPTION OF THE INVENTION

Figure 1:
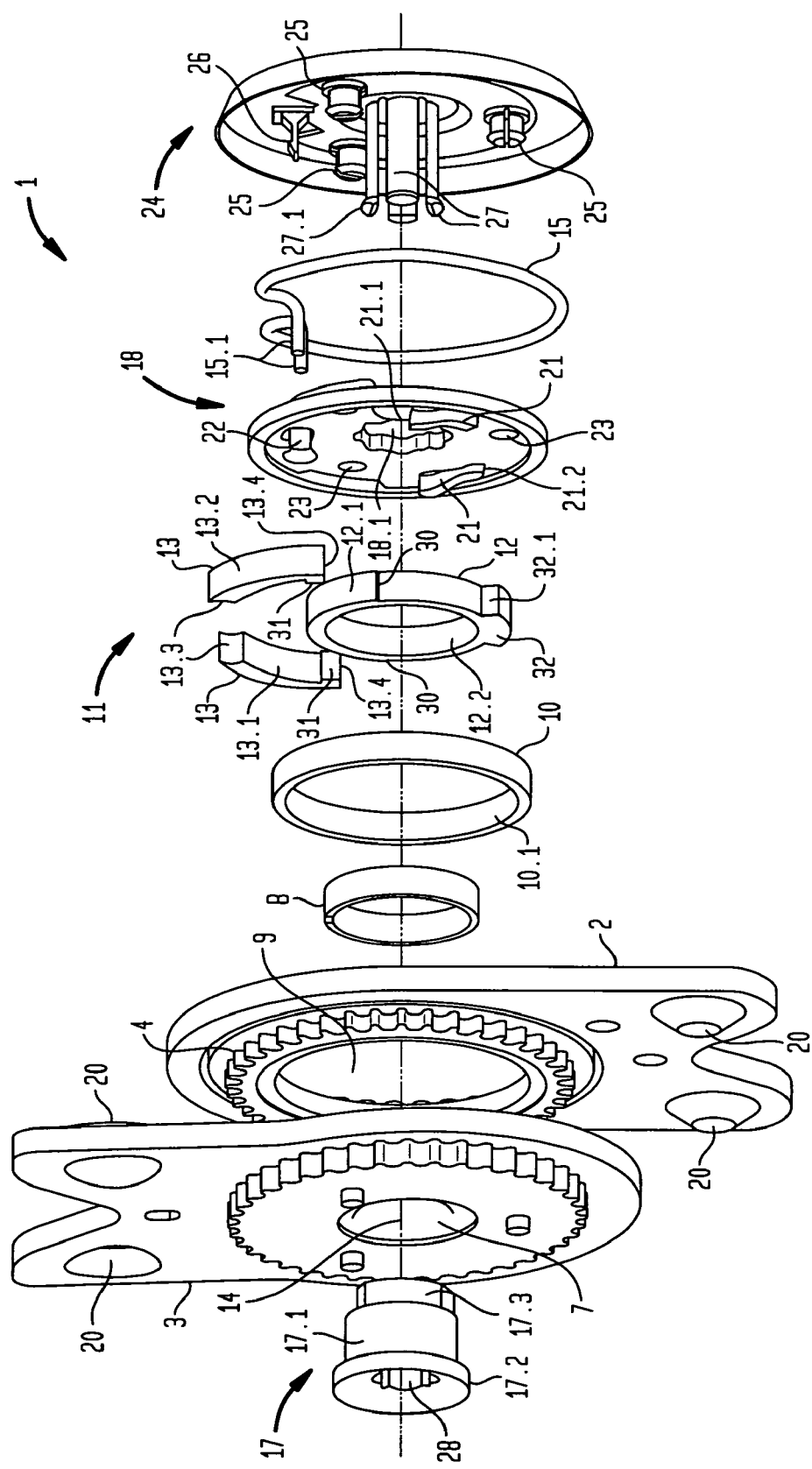
FIG. 1 represents the components of a device for adjusting inclination according to the invention in a perspective exploded view.
Figure 2:
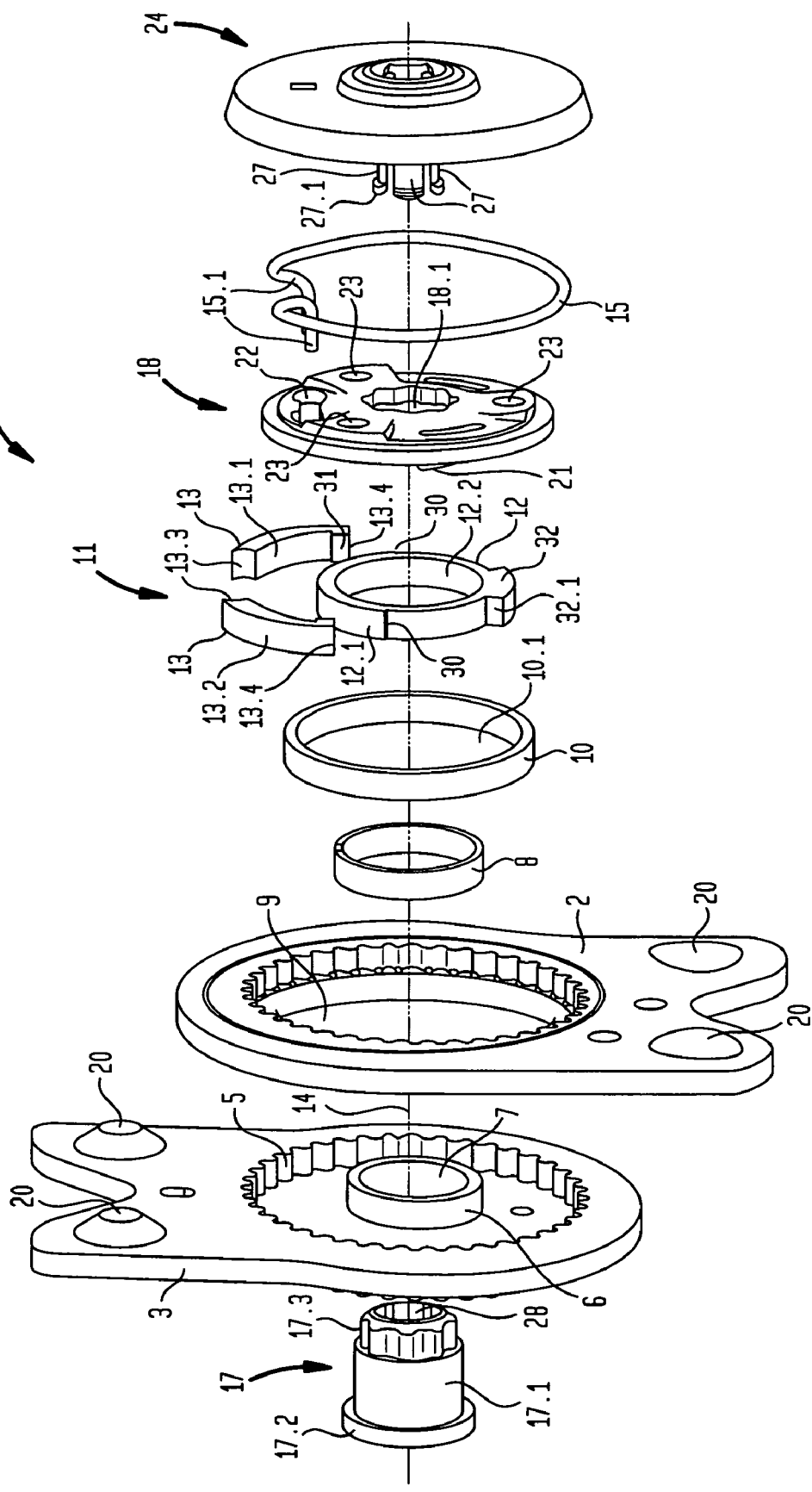
FIG. 2 is a representation according to FIG. 1, for a different point of view.

During the course of this description, like numbers will be used to identify like elements according to the different views that illustrate the invention.

The device for adjusting inclination 1 represented in the figure is part of an motor vehicle seat (not shown) having a seat part and a back part, whereby the back part can be adjusted in its inclination relative to the seat part by using a device for adjusting inclination 1. To do this, the inclination adjustment device 1 has a device part 2 affixed to the seat part and a device part 3 affixed to the back part. The two device parts 2, 3 are deep-drawn steel plates, wherein the device part 2 has an outside gearing 4 pressed from the plate and device part 3 has an inside gearing 5 pressed from the plate. The outside gearing 4 has—in the same module—a gearing with one tooth less than that of the inside gearing 5. In the assembled device for adjusting inclination 1 the outside gearing 4 would come together with the inside gearing 5.

In addition, the device part 3 has a passage 6 expressed concentrically to the inside gearing 5 with a circular passage opening 7. An inner bearing ring 8 can be slipped onto the passage 6. The device part 2 also has a circular passage 9 concentrically arranged relative to the external gearing 4, into which an outer bearing ring 10 can be inserted.

The bearing rings 8, 10 serve to bear eccentric elements 11. These consist of an eccentric ring 12 and two identical, mirrored wedge segments 13 arranged on it. In the assembled condition the eccentric ring 12 is pushed onto the inner bearing ring 8, the wedge segments 13 lie with their inner surfaces 13.1 on the outside surface 12.1 of the eccentric ring 12 and the outer surfaces of the outer surfaces 13.2 of the wedge segments 13 are supported on the inside 10.1 of the outside bearing ring 10. This arrangement can be best seen in the representation according to FIG. 7. In order to avoid the presence of only one contact point between the inside bearing ring 8 and the inside surface 12.2 of the eccentric ring 12, which results in a "tilting" of the device part 3 on device part 2, the inside surface 12.2 of the eccentric ring 12 is imperfectly round compared to the inside bearing ring 8, so that there are at least two contact points between these to components. The wedge segments 13 also do not flatly lie with their inside surfaces 13.1 on the outsides of 12.1 of the eccentric ring 12. The alternating curvature of the inside surfaces 13.1 and the outside surfaces 12.1 are designed so that between them there is linear contact. The outside surfaces 13.2 of the wedge segment 13 have, on the other hand, the same curvature as that of the inside 10.1 of the outside bearing ring 10. The wedge segments 13 consequently lie flatly on the outside mounting ring 10.

Figure 8:
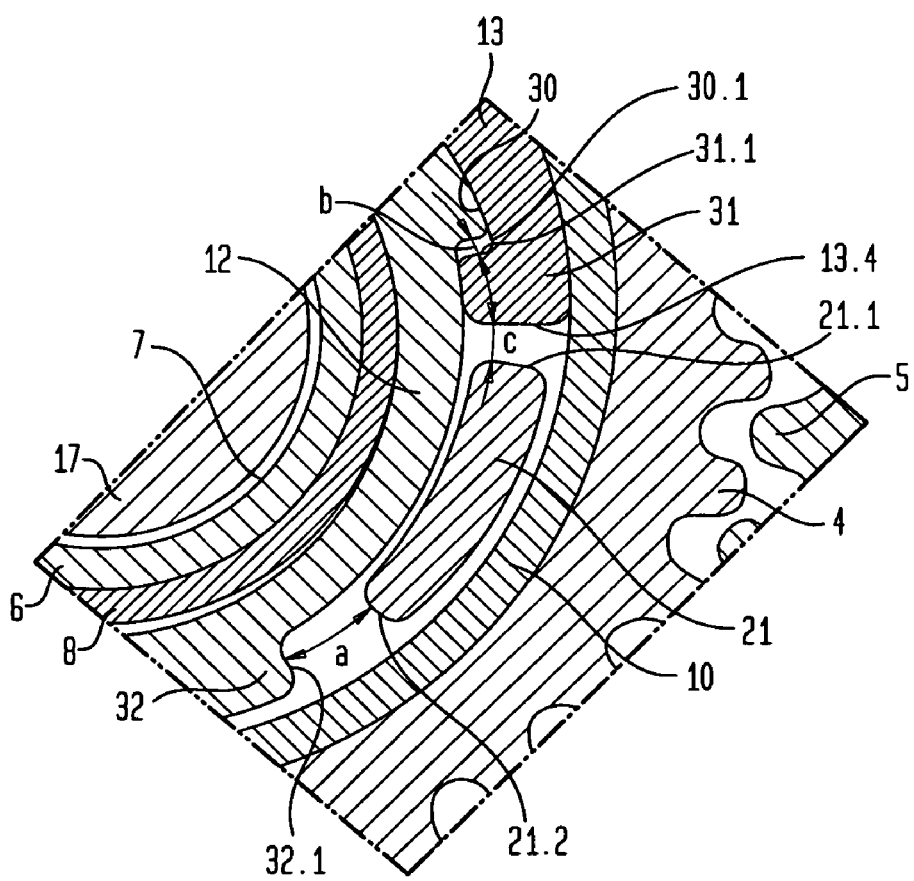
FIG. 8 represents an enlarged section D according to FIG. 7.

The outside 12.1 of the eccentric ring 12 covered by the wedge segments 13 rises wedgelike opposite its inside 12.2. The increasing wall thickness of the eccentric ring 12 resulting therefrom is utilized at the end of the rise for forming a projection 30 having a radially outwardly oriented stop surface 30.1, wherein said protrusion 30 is formed by a material reversal to a smaller dimension of the eccentric ring 12. Stop surfaces 31.1 are associated with these stop surfaces 30.1 of the eccentric ring 12, which are provided with a radially inwardly oriented projection 31 at a zone of the narrow surface 13.4 of the wedge segment 13. Between the stop surfaces 30.1 and 31.1 there is a space b in the un-operated eccentric element 11, which is best represented in FIG. 8. In virtue of the cuneiform rise of the outside 12.1 of the eccentric ring 12 the insides 13.1 of the wedge segments 13 have contact with an opposing wedge surface. This opposing wedge formation makes possible an optimum layout of the wedge angle of the wedge segments 13.

A stop cam 32 having two radial stop surfaces 32.1 symmetrical to the two projections 30 of the eccentric ring 12 is formed by its free zone wedge segments 13 by strengthening of the wall thickness of the eccentric ring 12.

Figure 3:
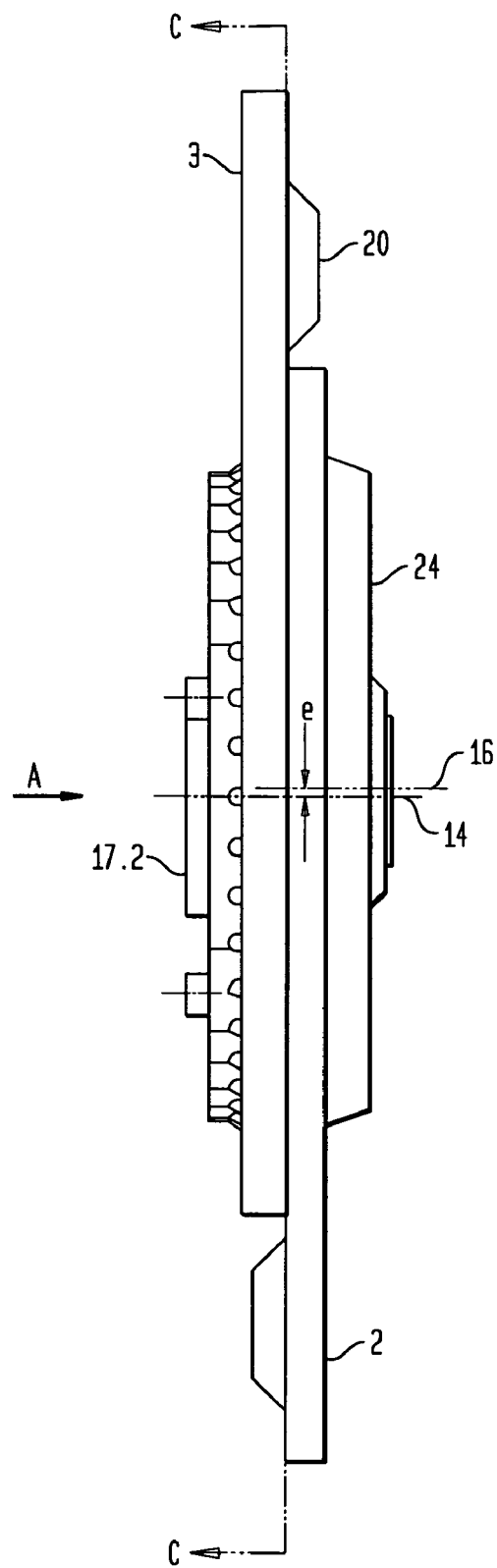
FIG. 3 represents a side view of the assembled device for adjusting inclination.
Figure 4:
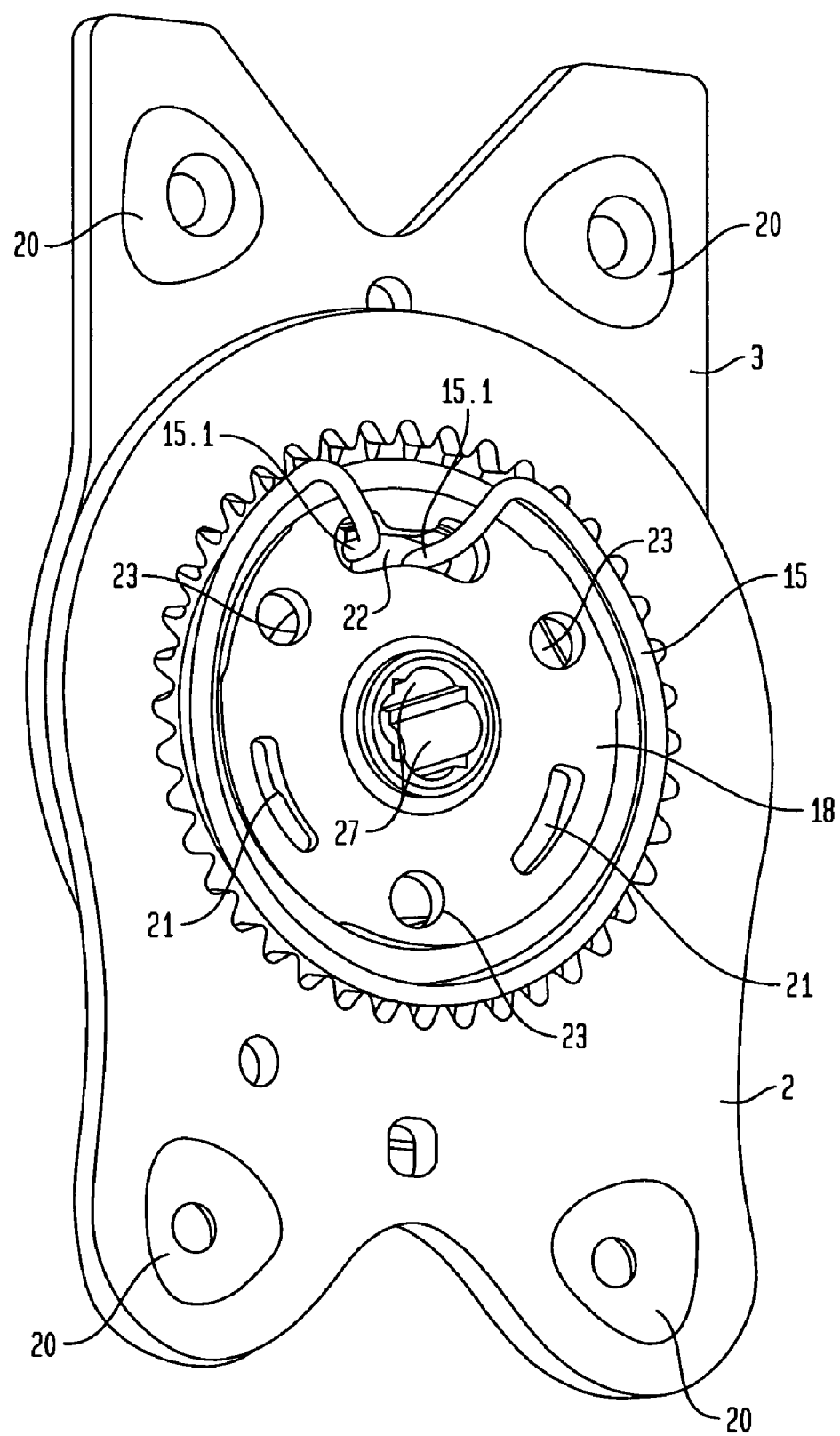
FIG. 4 represents a perspective view onto the representation according to FIG. 3 opposite to the direction of the arrow A with the cover removed.
Figure 6:
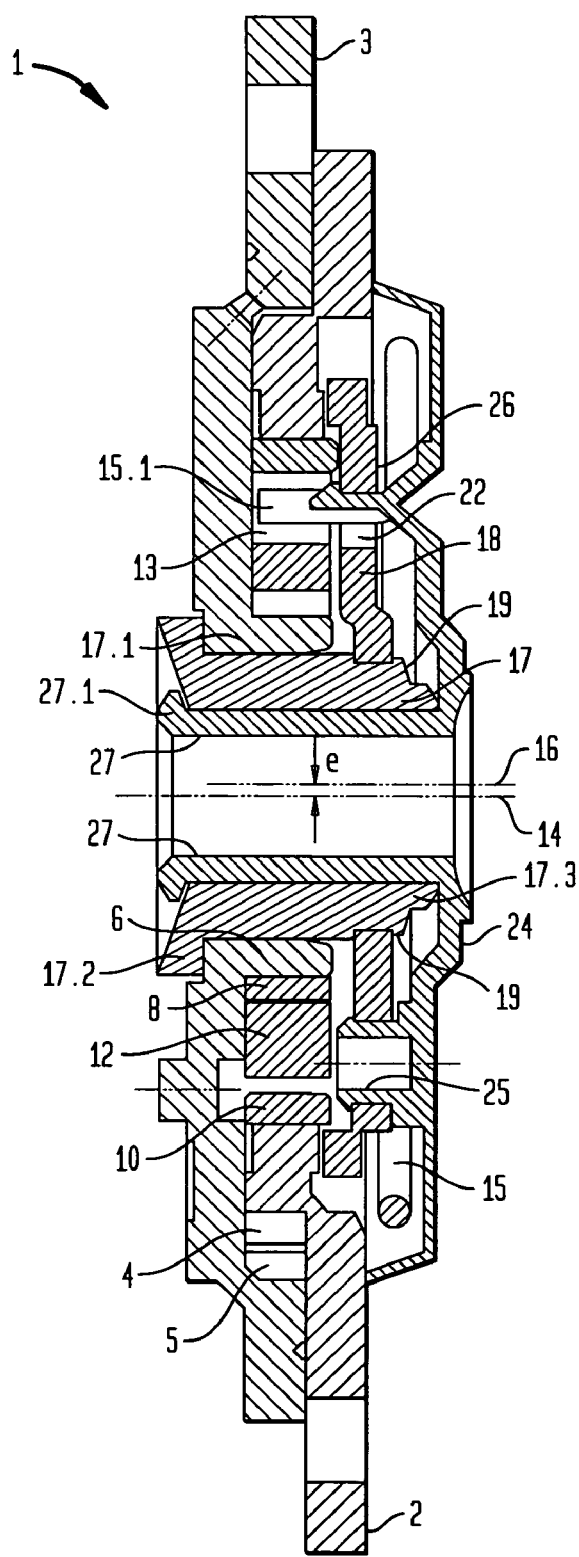
FIG. 6 represents a section B—B according to FIG. 5.

Because of this intervention of the eccentric element 11 between the two device parts 2 and 3 there is an eccentricity e between the central axis of the passage opening 7 of the device part 3 forming the pivot axis 14 of the device for adjusting inclination and the central axis 16 of the passage opening 9 of the device part 2 (see FIGS. 3 and 6). This eccentricity e assures that the outer gearing 4 in extension of the direction of the eccentricity e is urged into the inner gearing 5 of the device part 3. In order to form this engagement of outer gearing 4 and inner gearing 5 and the bearing of the two device parts 2 and 3 without any play, the wedge segments 13 are loaded by spring elements in such a fashion that they are urged away from each other peripherally on the eccentric ring 12 in terms of an increase of eccentricity e. In the present exemplary embodiment an omega spring 15 is provided as the spring element, whose rectangular members 15.1 abut on the facing surfaces 13.3 of the wedge segments 13 and urge these, as described, apart from one another.

The arrangement described above ensures that the device for adjusting inclination 1 is arrested without play in each set inclination of the back part, because the forces acting from the back part radially are absorbed by the wedge segments 13; that is, no controlling torques act upon them. The tension exerted by the omega spring 15 on the wedge segments 13 can be relieved only by the peripheral forces acting on the wedge segments 13. In order to introduce such actuating movement on the eccentric element 11, a two-part carrier comprised of a carrier hub 17 and a carrier disk 18 is provided. The carrier will be more completely described in the following.

Both the carrier hub 17 and the carrier disk 18 are made of metal. In this case the carrier hub 17 is executed as a die casting—or as a forged part—and the carrier disk 18 is a metal plate punched part. The carrier hub 17 has a cylindrical center section 17.1, a collar 17.2, which projects over the cylindrical center section 17.1 at a diameter, and a flange 17.3, which is somewhat smaller in diameter and having an out-of-round cross-section; that is, a cross-section for transferring a torque. In the installed state, the center section 17.1 extends beyond the passage opening 7 of the passage 60 with low radial clearance, while its collar 17.2 lies externally on the device part. On the other side of the device for adjusting inclination 1 the carrier disk 18 is slipped onto the flange 17.3 of the carrier hub 17. In order to do this, the carrier disk 18 has a central opening 18.1 having the same out-of-round cross-section as the flange 17.3. After slipping on of the carrier disk 18 on the flange 17.3, the carrier disk 18 is thus seated non-rotationally on the carrier hub 17. For axial fastening of the carrier disk 18 to the carrier hub 17 material of the flange 17.3 is displaced onto the carrier disk 18, so protruding lugs 19 occur that vis-a-vis the cross-section of the central opening 18.1 of the carrier disk 18, as shown in FIG. 6. Consequently, the carrier hub 17 and the carrier disk 18 are bonded together by the lugs 19.

As can be seen also in the representation of FIG. 6, there is an axial clamping of the two device parts 2 and 3 in addition to the retainers (not shown in the figure) in virtue of the collar 17.2 of the carrier hub 17 abutting on the device part 3 and the carrier disk 18 abutting on the device part 2 on the other side of the adjusting device 1. These retainers are welded using weld bridges 20 to the device parts 2 and 3 and overlap the respective other device part 2 or 3 zonally on the periphery of the inner gearing 4 or the outer gearing 4.

The carrier disk 18 has to expressed carrier fingers 21. In the assembled device for adjusting inclination 1 these carrier fingers 21 reach over into an interspace formed between the eccentric ring 12 and the outer mounting ring 10. When this is done, their one surface 21.1 with un-operated eccentric elements 11 lies peripherally at a distance c from the surfaces 13.4 of the wedge segments 13 facing away from the omega spring 15. This peripheral space c between the surfaces 21.1 and 13.4 is provided so that the actuation movement of the wedge segments 13 by the omega spring 15 is not limited by premature contact with these two surfaces 13.4 and 21.1. The other surfaces 21.2 of the carrier finger 21 lie in this situation at a distance a from the stop surfaces 32.1 of the stop cam 32.

Along with the carrier fingers 21, the carrier disk 18 also has openings 22 and 23. The opening 22 serves as the passage for the member 15.1 of the omega spring 15, while the openings 23 are used for locking a plastic cover 24 on the carrier disk 18. To achieve this catch nubs 25 are provided on the cover 24, which can be pushed into the openings 23 and can be locked in back of the holes. As a supplemental locking means a spring tab 26 is provided on the cover 24, which passes through the opening 22 of the carrier disk 18 and latches behind it.

The cover 24 is used to cover the omega spring 15 and the carrier disk 18; particularly, however, covering of the open articulation zone of the device for adjusting inclination 1, in order to protect it from contamination, especially at the time of painting operations.

Figure 5:
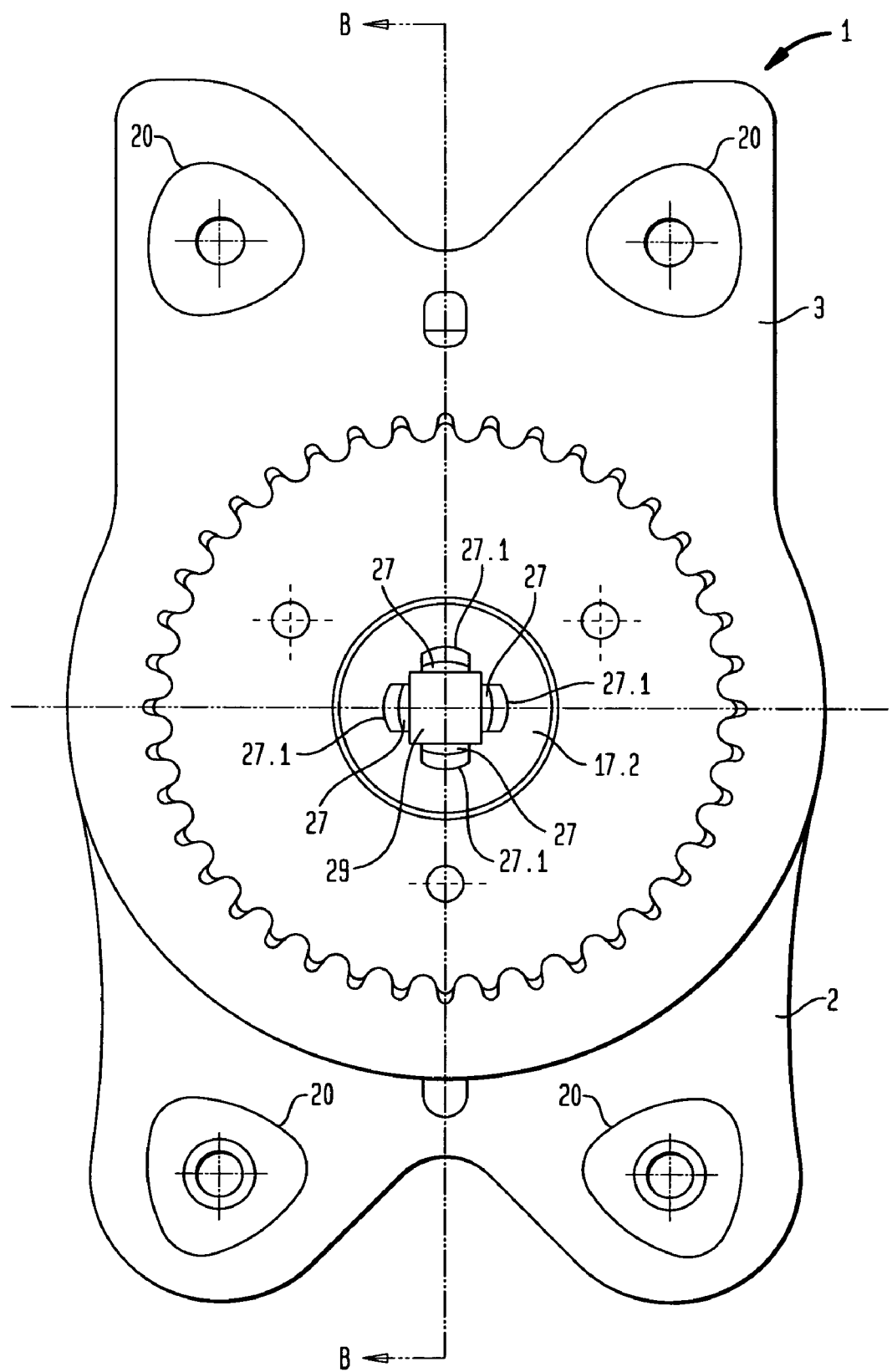
FIG. 5 is a representation according to FIG. 3 in the direction of the arrow A.

The cover 24 has a hub formed by four tabs 27, which is insertable positive fittingly into a central recess 28 of the carrier hub 17. When this is done the inner surfaces of the tabs 27 form an out-of-round cross-section 29, in the case of this exemplary embodiment a square cross-section, for positive reception of a drive rode (not shown) (see FIG. 5). This drive rod serves in the introduction of a torque into the device for adjusting inclination 1 and can be part of a hand wheel or a motor-driven shaft. At the ends of the tabs 27 of the cover 24 latching projections 27.1 are provided projecting radially outwardly. These latch behind their collars 17.2 after pushing through the tabs 27 through the carrier hub 17, as shown in FIG. 6. With the incorporated drive rod the tabs 27 can now no longer cushion radially, whereby the latching between the projections 27.1 and the collar 17.2 is secured.

The secured configuration of the cover 24 assures, in co-operation with the carrier hub 17 for their secure axial hold on the device for adjusting inclination 1, and for an additional axial clamping of the two device parts 2 and 3. In addition, the plastic tabs 27 arranged between the drive rod and the carrier hub 17 prevent a metal-to-metal contact between the drive rod and the carrier hub 17, whereby undesired rattling noise is avoided.

For actuation of the device for adjusting inclination 1 a torque is transferred to the carrier disk 18 via the drive rod, driven by the handwheel or a motor-driven unit, the tabs 27 of the hub of the cover 24 and the carrier hub 17. When this is done, the front 21.1 of one of its carrier fingers 21 reaches, depending on in which direction it is rotated, by overcoming the space c in contact with the front 13.4 of the wedge segments 13 associated with said carrier finger 21. Upon further rotation of the carrier disk 18 work is applied against the force of the omega spring 15; that is, the tension of the wedge segment 13 loaded by the carrier fingers 21 between the eccentric ring 12 and the outside bearing 10, is released by overcoming the space b. The stop surfaces 31.1 and 30.1 of the projections 31 and 30 of wedge segment 13 now lie adjacent to each other, so that the eccentric ring 12 is rotated about the pivot axis 14. When this is done, the other wedge segment 13 is released, so that a radial clearance intervenes for displacement of the device for adjusting inclination 1. Upon further drive by the drive rod, the wedge segments 13 co-rotate together with the eccentric ring 12 about the pivot axis 14. Because of this rotary movement of the eccentric element 11, the direction of the eccentricity e and thus also the point of action of the outer gearing 4 shifts into the inner gearing 5. A swash rolling movement of the outer gearing 4 on the inner gearing 5 consequently occurs and the device part 3 pivots on the stationary device part 2. Once the induction of the rotary movement of the device for adjusting inclination 1 is terminated, the omega spring 15 urges the wedge segments 13 again into its original position; that is, the eccentricity e is again increased, whereby the radial clearance required for the displacement movement is eliminated and the back part is again arrested.

An overloading of the omega spring 15 upon displacement of the device for adjusting inclination 1 is not possible, because the smallest possible space between the members 15.1 of the omega spring 15 is defined by the stop of the projections 31 and 30 of the wedge segments 13 or the eccentric ring 12.

Figure 7:
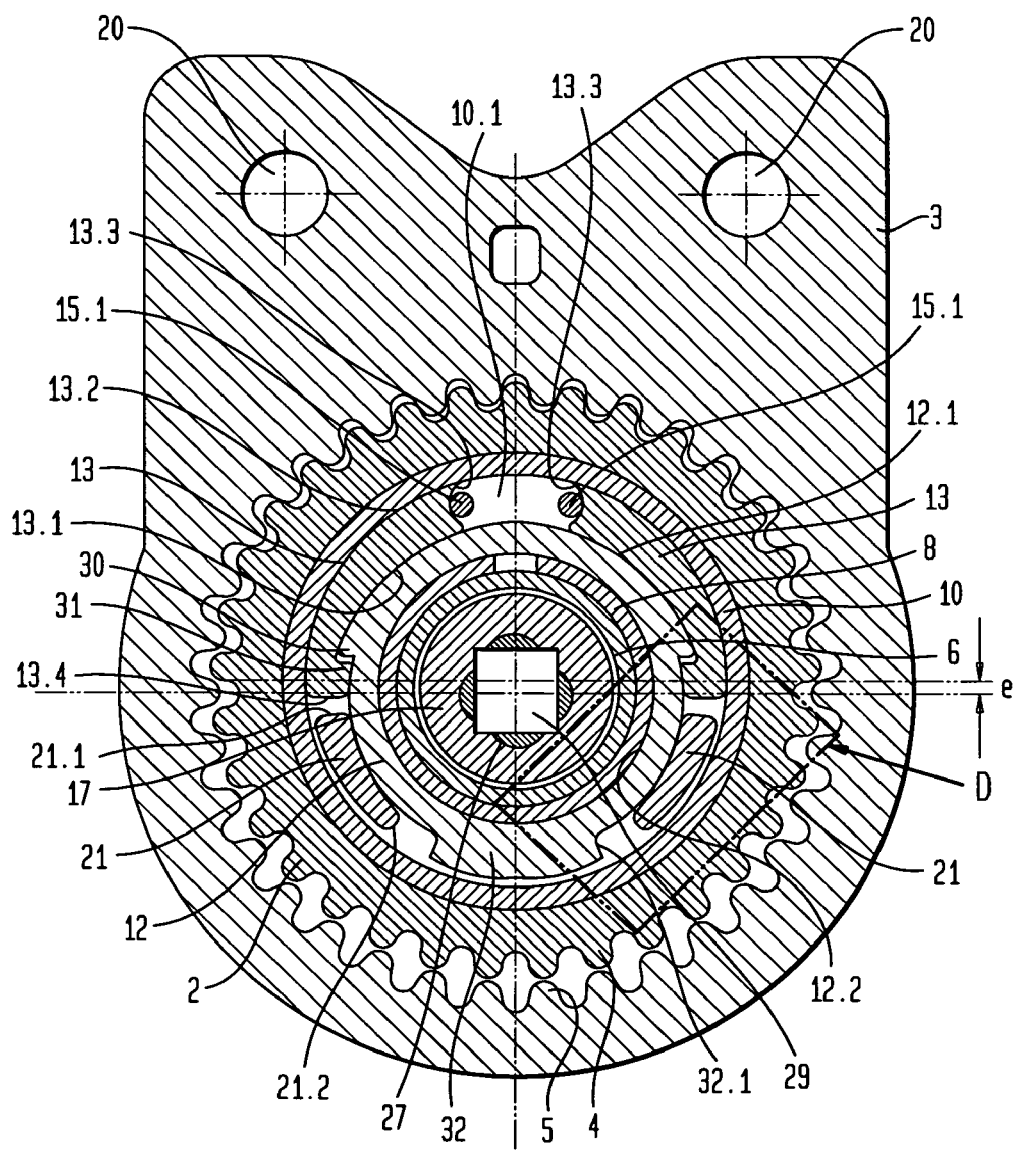
FIG. 7 represents a section C—C according to FIG. 3.

In FIG. 7 it can be seen that the space between the surfaces 13.3 of the wedge segments 13 is free of any structural elements, so that the omega spring 15 can be satisfactorily mounted.

It has been described above, with the driving of the eccentric element 11 the spaces b between the stop surfaces 31.1 and 30.1 of the projections 31 and 30 as well as c between the surface 13.4 of the loaded wedge segments 13 and the front surface 21 of the loaded carrier finger 21 are overcome. The sum of the spaces b and c corresponds to the space a between the front surface 21.2 of the carrier finger 21 and the stop surfaces 32.1 of the stop cam 32. This means that when displacing the eccentric element 11, not only the spaces b and c are eliminated; that is, the projection 31 of the loaded wedge segment 13, the associated projection 30 of the eccentric ring 12 and the loaded carrier finger 21 lie in block, but also the space a is eliminated; that is, the carrier finger 21 not loading the wedge segments 13 lies in abutment on the stop cam 32. Because of this arrangement, the carrier fingers 21 of the carrier disk 18 have two contact points with the eccentric ring 12, that are separated over 90° from each other. Accordingly, the carrier disk 18 centers itself on the eccentric ring 12, so that the carrier hub 17 non-rotatingly jointed with the carrier ring 18 is also centered in the passage opening 7 of the passage 6 of the device part 3. When this is done, the carrier hub 17 runs principally friction-free in the device part 3, which acts advantageously on the smoothness of the device for adjusting inclination 1.

While the invention has been described with reference to the preferred embodiment thereof, it will be appreciated by those of ordinary skill in the art that modifications can be made to the parts that comprise the invention without departing from the spirit and scope thereof.

The invention claimed is:

1. A device for adjusting the inclination of the back part of a motor vehicle seat having a device part (2) connected to the seat part and a device part (3) connected to the back part, which can be swiveled counter to each other about a pivot axis (14), whereby both device parts (2, 3) have parts of gearings (4, 5) forming a swash mechanism, which roll on each other under the action of eccentric elements (11) rotatable about the pivot axis (14), which have an eccentric ring (12), on which two mirror-image wedge segments (13) lie zonally covering it, which are urged away from each other by a spring element (15) abutting its front surface (13.3) in the sense of an increase of eccentricity (e), and that carrier elements (21) are arranged between the other front surfaces (13.4) of the wedge segments (13) for loading the wedge segments (13) against the force of the spring elements (15), whereby the eccentric elements (11) bear a device part (2), while the other device part (3) bears the eccentric element (11), characterized in that in the zone of the other front side (13.4) of the wedge segments (13) a radial stop surface (31.1) is provided thereon, which is associated with a radial stop surface (30.1) of the eccentric ring (12), whereby the alternating stop surfaces (31.1, 30.1) are separated from each other prior to introduction of a displacement in the displacement direction, and when introducing a displacement, the carrier element (21) loads one of the two wedge segments (13) depending on the displacement direction, so that at least the stop surface (31.1) of the loaded wedge segment (13) and the associated stop surface (30.1) of the eccentric ring (12) come into contact with each other and carry the eccentric ring (12) along.

2. The device for adjusting inclination according to claim 1, wherein the carrier elements are comprised of a carrier hub (17) mounted rotationally in a passage (8) of the device part (3) bearing the eccentric elements (11) and a carrier disk (18) mounted non-rotationally with same, which has non-rotational carrier fingers (21) connected to it, and that the eccentric ring (12) is seated rotationally directly or indirectly via interposition of a bearing ring (8) and the wedge segments (13) can be loaded by the carrier fingers (21) in the peripheral direction, whereby the stop surface (31.1) of the wedge segment (13) is formed by radially inwardly projecting protrusions (31) and the stop surface (30.1) of the eccentric ring (12) is formed by radially outwardly protruding projections (30).

3. The device for adjusting inclination according to claim 2, characterized in that the outside (12.1) of the eccentric ring (12) covered by the wedge segments (13) rises wedge-like vis-a-vis its inside surface (12.2) and the projections (30) of the eccentric ring (12) are formed by a material recess to a smaller external dimension of the eccentric ring (12).

4. The device for adjusting inclination according to claim 2, wherein the eccentric ring (12) has a stop cam (32) with radial stop surfaces (32.1) arranged symmetrically to its projections (30), which have a space (a) to the carrier fingers (21) prior to introduction of a displacement, which corresponds to the sum of the spaces (b, c) between the alternating stop surfaces (31.1, 30.1) of the wedge segments (13) and the eccentric ring (12) or between the carrier fingers (21) and the front (13.4) of the associated wedge segment (13).

5. The device for adjusting inclination according to claim 3, wherein the eccentric ring (12) has a stop cam (32) with radial stop surfaces (32.1) arranged symmetrically to its projections (30), which have a space (a) to the carrier fingers (21) prior to introduction of a displacement, which corresponds to the sum of the spaces (b, c) between the alternating stop surfaces (31.1, 30.1) of the wedge segments (13) and the eccentric ring (12) or between the carrier fingers (21) and the front (13.4) of the associated wedge segment (13).

* * * * *